(12) United States Patent
Naneng et al.

(10) Patent No.: US 10,322,614 B1
(45) Date of Patent: Jun. 18, 2019

(54) AMPHIBIOUS VEHICLE

(71) Applicants: William Naneng, Hooper Bay, AK (US); Terence Naneng, Hooper Bay, AK (US)

(72) Inventors: William Naneng, Hooper Bay, AK (US); Terence Naneng, Hooper Bay, AK (US)

( * ) Notice: Subject to any disclaimer, the term of this patent is extended or adjusted under 35 U.S.C. 154(b) by 0 days.

(21) Appl. No.: 16/114,520

(22) Filed: Aug. 28, 2018

(51) Int. Cl.
*B62M 27/02* (2006.01)
*B60F 3/00* (2006.01)
*B63B 35/73* (2006.01)

(52) U.S. Cl.
CPC ........... *B60F 3/0076* (2013.01); *B62M 27/02* (2013.01); *B62M 2027/023* (2013.01); *B62M 2027/028* (2013.01); *B63B 35/731* (2013.01)

(58) Field of Classification Search
CPC .............................. B63B 35/731; B62M 27/02
See application file for complete search history.

(56) References Cited

U.S. PATENT DOCUMENTS

| | | | | |
|---|---|---|---|---|
| 4,893,692 A * | 1/1990 | Smith | ..................... | B62M 27/02 180/190 |
| 5,150,662 A * | 9/1992 | Boyd | ..................... | B62M 27/02 114/68 |
| 5,682,832 A * | 11/1997 | Millard | ................. | B60F 3/0076 114/123 |
| 6,062,156 A * | 5/2000 | Radke | ................... | B60F 3/0076 114/123 |
| 6,595,812 B1 * | 7/2003 | Haney | ................... | B60F 3/0015 114/360 |
| 7,055,454 B1 * | 6/2006 | Whiting | ...................... | B62J 9/00 114/364 |
| 7,089,917 B1 * | 8/2006 | McKinster | ............... | B62J 37/00 123/509 |
| 7,422,295 B2 * | 9/2008 | Rasmussen | ............ | B62D 55/07 305/165 |
| 7,530,345 B1 * | 5/2009 | Plante | ..................... | B60K 31/00 123/361 |
| 7,559,576 B1 * | 7/2009 | Honkala | .................. | B62D 1/18 280/775 |
| 7,673,711 B1 * | 3/2010 | Berg | ...................... | B62D 55/02 180/9.21 |
| 8,678,868 B2 * | 3/2014 | Bailey | ..................... | B63B 35/74 114/248 |
| 8,777,680 B2 * | 7/2014 | MacDonald | .............. | B63B 1/14 440/12.56 |

(Continued)

*Primary Examiner* — S. Joseph Morano
*Assistant Examiner* — Jovon E Hayes
(74) *Attorney, Agent, or Firm* — Michael J. Tavella

(57) ABSTRACT

An amphibious vehicle that has combined structure of a snowmobile and a small water craft. The device has a front track that is connected to a steering mechanism of a snowmobile. A seat is provided for one or more riders. A track drives the snow mobile and helps to propel the boat when on water. However, the device also has a jet drive attached to the drive system of the motor. A water intake that is also driven by the motor is also provided to ensure adequate water for the jet drive. The device is steered with a handlebar much like a snowmobile. And can be easily moved from land to water and back to land again. The invention can be used for recreation, by first responders, or by other industry or government operations. Moreover, the invention can augment existing amphibious vehicles.

7 Claims, 3 Drawing Sheets

(56) References Cited

U.S. PATENT DOCUMENTS

| | | | |
|---|---|---|---|
| 9,193,235 B2 * | 11/2015 | Davisson | B60F 3/0015 |
| 9,216,623 B1 * | 12/2015 | Pistsov | B60F 3/0076 |
| 9,555,678 B2 * | 1/2017 | Gibbs | B60F 3/0007 |
| 2001/0047894 A1 * | 12/2001 | Maguire | B60F 3/0007 |
| | | | 180/9.38 |
| 2006/0070782 A1 * | 4/2006 | Morin | B62M 27/00 |
| | | | 180/190 |
| 2011/0290574 A1 * | 12/2011 | Maltais | B62M 27/02 |
| | | | 180/190 |

* cited by examiner

AMPHIBIOUS VEHICLE

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to amphibious vehicles and particularly to amphibious vehicles having a track drive.

2. Description of the Prior Art

People have been using boats for thousands of years. Snowmobiles have also been used for many years as well. The idea for using a snowmobile as a boat has also been considered. To that end, several such vessels have been designed. Examples of these machines are found in the following U.S. Patents. U.S. Pat. No. 3,011,184 teaches an inflatable raft that accommodates a jeep type vehicle. The vehicle propels the raft using the wheels as propellers. Although workable, it has several problems. First, it is an inflatable raft, which is subject to punctures, which can be dangerous for the vehicle operators if the raft sinks. Second, using the wheels to propel the vehicle in the water may work, but it is highly inefficient. U.S. Pat. No. 3,474,751 teaches a snowmobile that is an amphibious vehicle. This vehicle has a buoyant body and dual tracks that are used to drive the vehicle on a snow surface, or through the water. Although and improvement of the raft, this device suffers from a hull that is narrow. Moreover, the dual track system is complicated and subject to maintenance and operational issues. U.S. Pat. No. 3,521,595 teaches another snowmobile design for use on water. In this device, a regular snowmobile is fitted into a large hull design. This hull supports the snowmobile. The device is propelled through the water using the snowmobile's track. The problem with this design is that the skis mounted on the front of the snowmobile must be removed so that the steering mechanism of the snowmobile can be attached to the hull of the vessel. This necessitates work to remove skis and mount the snowmobile on the vehicle and then, when after the water voyage, the skis must be reattached for land use. U.S. Pat. No. 3,646,904 is a conversion kit to modify a snowmobile for use on the water. In this kit, an inflatable hull with a metal frame is used to support the body of a modified snowmobile. Here, the track and skis are removed. A propeller is attached to the drive shaft of the snowmobile engine. The front end is attached to a steering mechanism. When completed, this conversion allows a user to go on water with the snowmobile. However, the conversion is extensive and does not appear to allow the device to easily switch from the water vessel to a snowmobile and back to a water vessel again.

BRIEF DESCRIPTION OF THE INVENTION

The instant invention is an amphibious vehicle that has a combined structure of a snowmobile and a small water craft. The device has a front track that is connected to a steering mechanism of a snowmobile. A seat is provided for one or more riders. A track drives the snow mobile and helps to propel the boat when on water. However, the device also has a jet drive attached to the drive system of the motor. A water intake that is also driven by the motor is also provided to ensure adequate water for the jet drive. The device is steered with a handlebar much like a snowmobile. And can be easily moved from land to water and back to land again. The invention can be used for recreation, by first responders, or by other industry or government operations. Moreover, the invention can augment existing amphibious vehicles.

DETAILED DESCRIPTION OF THE INVENTION

Figure 1:
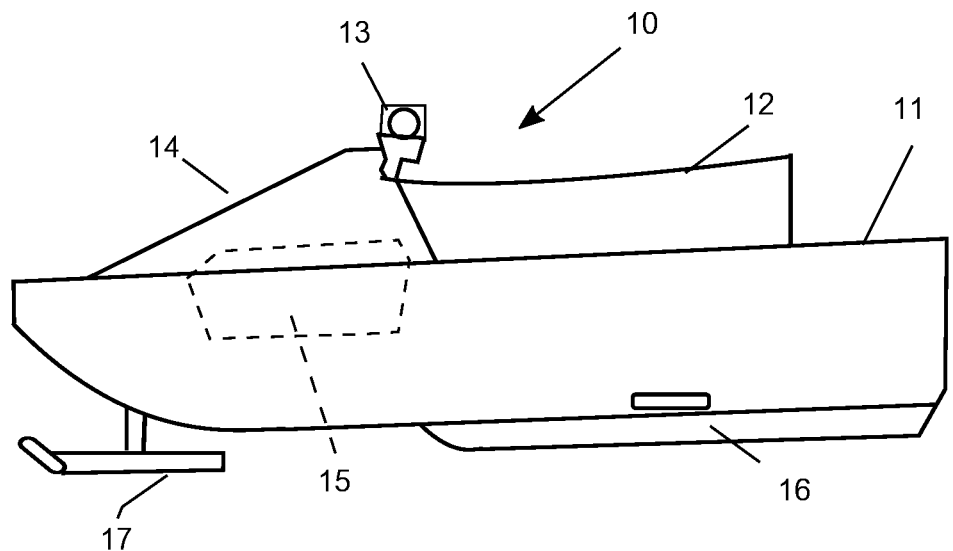
FIG. 1 is a side view of the invention.

Referring now to the drawings and especially FIGS. 1-4, FIG. 1 is a side view of the invention 10. The invention 10 is an amphibious vehicle that has a hull 11, a seat 12, a steering handlebar 13, an engine cowling 14, an engine 15, a track 16 and a pair of front skis 17. The engine 15 is controlled by a throttle 18 mounted on the handlebar 13 (see, e. g., FIG. 2). The skis, track, seat, steering, engine and controls are essentially those of a snowmobile. Unlike a typical snowmobile, however, this device has a hull 11 that transforms the vehicle into an amphibious one. The vehicle is primarily propelled by the track-both on land and on the water. However, the vehicle also has a jet drive for use on water as well. The jet drive is discussed in more detail below. Steering is done using conventional methods using cables or other mechanisms to turn the front skis 17.

Figure 2:
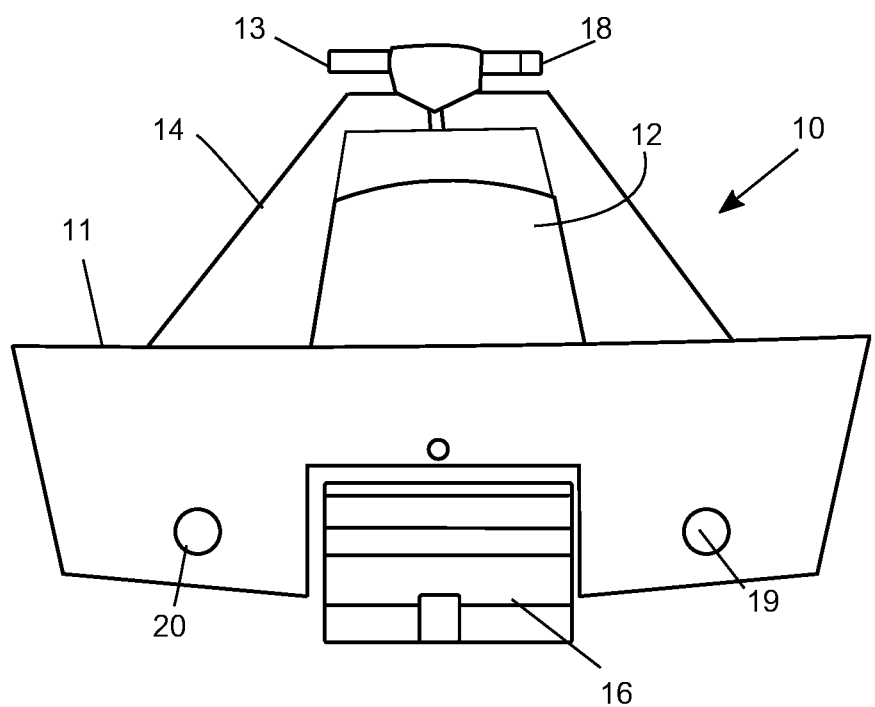
FIG. 2 is a rear view of the invention.

FIG. 2 is a rear view of the invention. In this figure, the shape of the hull 11 can be seen (see also, FIG. 4). The size of the hull provides for a stable ride in water without being cumbersome on land. As discussed above, in this view, the jet drive outlet 19 and the water inlet 20 for the jet drive pump are shown.

Figure 3:
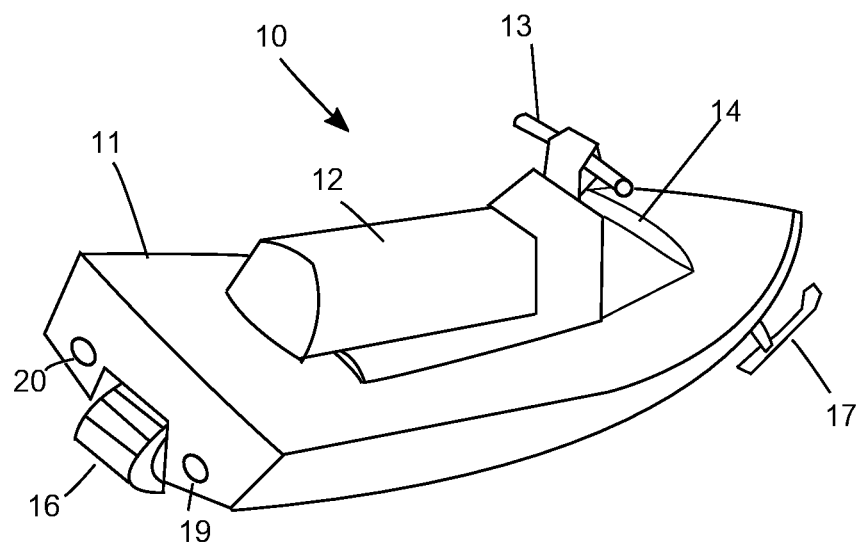
FIG. 3 is a rear perspective view of the invention.
Figure 4:
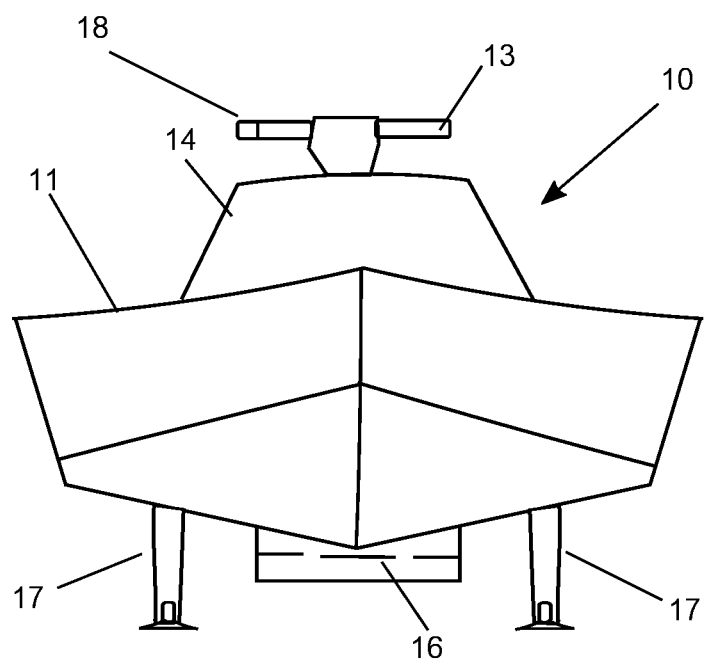
FIG. 4 is a front view of the invention.

FIG. 3 is a rear perspective view of the invention. Here, more details of the hull 11, seat 12, the steering handlebar 13, the track 16 the front skis 17 are shown. In addition, the he jet drive outlet 19 and the water inlet 20 for the jet drive pump are shown. FIG. 4 is a front view of the invention. Again, a different view of the hull 11, seat 12, the steering handlebar 13 and the front skis 17 are shown.

Figure 5:
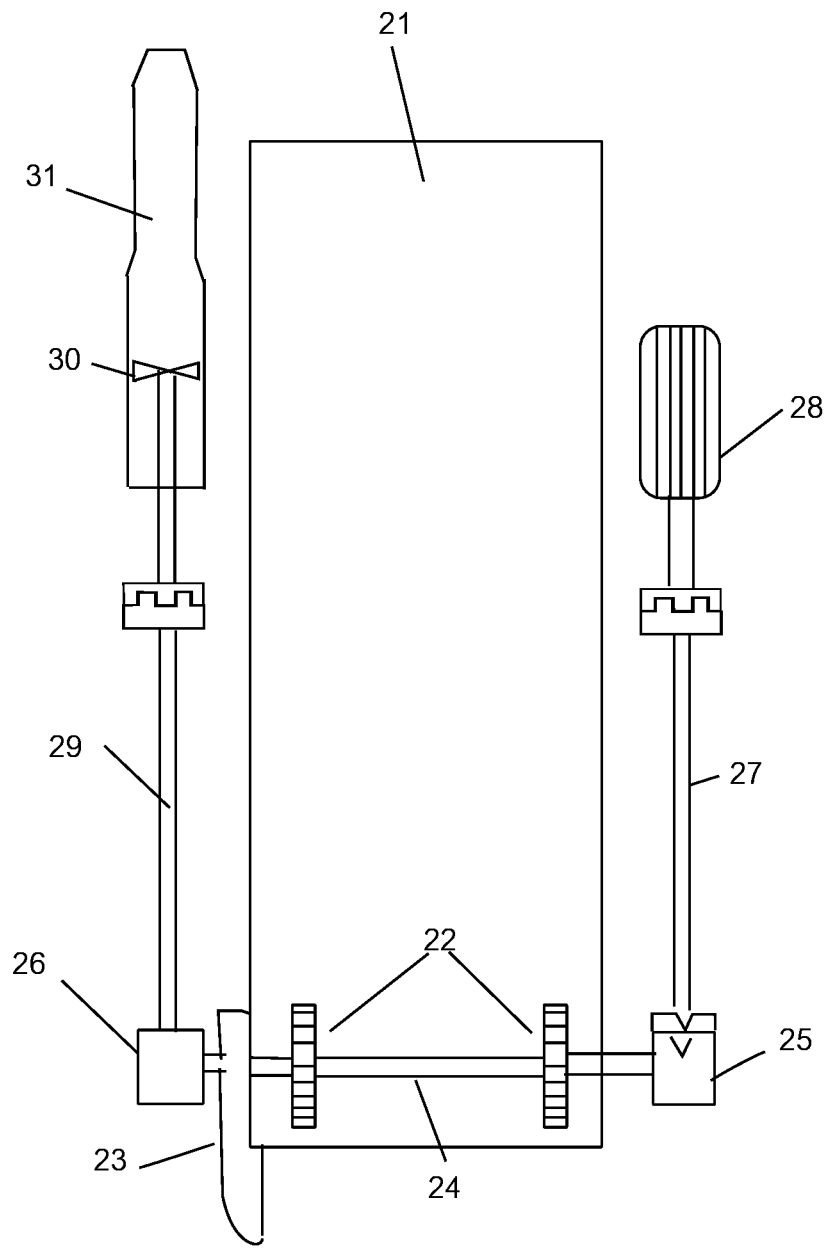
FIG. 5 is a detail view of a portion of the drive train an amphibious vehicle that has showing the gear boxes and shafts for the jet drive and the water intake of the invention.

FIG. 5 is a detail view of a portion of the drive train showing the gear boxes and shafts for the jet drive system that includes a water intake of the invention. In this view, the under carriage/chassis 21 is shown. The engine is not shown for clarity. The front sprockets 22 that drive the track are shown as is the chain case assembly 23. Attached to the sprocket shaft 24 are two c-gear units 25 and 26 that are used to rotate the movement of the sprocket shaft 24 by 90 degrees. The c-unit 25 is used to turn a shaft 27 that turns the impeller for the water intake 28 that provides additional water for the jet drive.

The second c-unit 26 drives a shaft 29 that turns the impeller 30 of the jet drive 31 when the craft is in the water.

A control on the dashboard (not shown) allows the user to start the jet drive when the craft has entered the water.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

We claim:

1. An amphibious vehicle comprising:
   a) a hull having a bow, a stern and a center portion, and underside, and an upper deck formed on said hull covering said center portion;
   b) a seat installed on said upper deck in said center portion of said hull;
   c) an engine, installed in said center portion of said hull;
   d) engine cowling, installed on said upper deck, and covering said engine;
   e) a steering handlebar installed on said upper deck;
   f) a track installed in said hull such that said track is partially suspended below said hull, said track also being in operative communication with said engine;
   g) a front skis, attached to the underside of said hull and being in operative communication with said steering handlebar;
   h) a jet drive system installed in said hull, including:
      i) an impeller; installed in said hull;
      ii) a c-gear unit, attached to a sprocket shaft installed in the hull; and
      iii) a shaft, in operative communication with said c-gear unit and also attached to said impeller.

2. The amphibious vehicle of claim 1 further comprising a throttle, mounted on the steering handlebar and being in operative communication with said engine.

3. The amphibious vehicle of claim 1 wherein the jet drive system further comprises:
   a) a water intake installed within the hull to supply water to the jet drive.

4. The amphibious vehicle of claim 3 wherein the jet drive system further comprises:
   a) a second c-gear unit, attached to a sprocket shaft installed in the hull; and
   b) a second shaft, in operative communication with said second c-gear unit and also attached to said water intake.

5. The amphibious vehicle of claim 1 wherein the sprocket shaft includes at least one front sprocket to drive the sprocket assembly.

6. The amphibious vehicle of claim 5 wherein the jet drive system further comprises a chain case assembly that is in operative communication with said sprocket shaft.

7. The amphibious vehicle of claim 6 wherein the sprocket shaft and at least one front sprocket are in operative communication with said engine.

* * * * *